(12) United States Patent
Wang et al.

(10) Patent No.: US 12,418,204 B2
(45) Date of Patent: Sep. 16, 2025

(54) LARGE-CURRENT AND LOW-VOLTAGE SERVO MOTOR

(71) Applicant: JINAN KEYA ELECTRON SCIENCE AND TECHNOLOGY CO., LTD., Jinan (CN)

(72) Inventors: Ruihao Wang, Jinan (CN); Hengshuai Zhang, Jinan (CN); Wei Xu, Jinan (CN); Fengmao Zhao, Jinan (CN)

(73) Assignee: JINAN KEYA ELECTRON SCIENCE AND TECHNOLOGY CO., LTD., Jinan (CN)

( * ) Notice: Subject to any disclaimer, the term of this patent is extended or adjusted under 35 U.S.C. 154(b) by 237 days.

(21) Appl. No.: 18/062,940

(22) Filed: Dec. 7, 2022

(65) Prior Publication Data
US 2023/0094808 A1  Mar. 30, 2023

Related U.S. Application Data

(63) Continuation of application No. PCT/CN2022/091742, filed on May 9, 2022.

(30) Foreign Application Priority Data

Aug. 5, 2021  (CN) .......................... 202110899177.X

(51) Int. Cl.
*H02K 1/16* (2006.01)
*H02K 1/14* (2006.01)
(Continued)

(52) U.S. Cl.
CPC ............. *H02K 1/165* (2013.01); *H02K 1/146* (2013.01); *H02K 1/278* (2013.01); *H02K 1/28* (2013.01); *H02K 3/12* (2013.01); *H02K 3/28* (2013.01)

(58) Field of Classification Search
CPC ............ H02K 21/16; H02K 1/28; H02K 3/28; H02K 1/146; H02K 1/278; H02K 1/165; H02K 3/12
See application file for complete search history.

(56) References Cited

U.S. PATENT DOCUMENTS 9,762,109 B2 * 9/2017 Yang .................... H02K 1/2733
2014/0210294 A1 * 7/2014 Wakita ................. H02K 1/2773
310/156.38

FOREIGN PATENT DOCUMENTS

CN       202513681 U       10/2012
CN       104810944 A   *   7/2015
(Continued)

OTHER PUBLICATIONS

CN-212751935-U machine translation Sep. 30, 2024.*
(Continued)

*Primary Examiner* — Leda T Pham
(74) *Attorney, Agent, or Firm* — Westbridge IP LLC

(57) ABSTRACT

Disclosed is a large-current and low-voltage servo motor, which includes: a housing with a mounting space inside; a stator assembly including a stator core arranged in the mounting space, and an inner circumference of the stator core being provided with stator slots for receiving coils, a coil winding being received in the stator slots, and the coil winding being a three-phase coil winding; and a rotor assembly including a rotor core, the stator core being sleeved on an outer peripheral surface of the rotor core, a plurality of magnetic steels of an arc shape being adsorbed on an outer peripheral surface of the rotor core, each magnetic steel having an inner arc surface and an outer arc surface eccentrical to the inner arc surface, and the plurality of magnetic steels are sequentially distributed to form alternate N and S polarities.

9 Claims, 9 Drawing Sheets

(51) Int. Cl.
*H02K 1/278* (2022.01)
*H02K 1/28* (2006.01)
*H02K 3/12* (2006.01)
*H02K 3/28* (2006.01)

(56) References Cited

FOREIGN PATENT DOCUMENTS

| | | | |
|---|---|---|---|
| CN | 204597648 | U | 8/2015 |
| CN | 204597671 | U | 8/2015 |
| CN | 204794437 | U | 11/2015 |
| CN | 108539943 | A | 9/2018 |
| CN | 208299658 | U | 12/2018 |
| CN | 111146890 | A | 5/2020 |
| CN | 212381014 | U | 1/2021 |
| CN | 212751935 | U * | 3/2021 |
| CN | 113644764 | A | 11/2021 |
| JP | 2002101585 | A | 4/2002 |
| JP | 2003037954 | A * | 2/2003 |

OTHER PUBLICATIONS

CN-104810944-A machine translation Sep. 30, 2024.*
JP-2003037954-A machine translation Sep. 30, 2024.*
First Office Action issued in counterpart Chinese Patent Application No. 202110899177.X, dated Jan. 30, 2022.
International Search Report and Written Opinion issued in corresponding PCT Application No. PCT/CN2022/091742, dated Jul. 20, 2022.
Refusal Decision issued in counterpart Chinese Patent Application No. 202110899177.X, dated Jul. 5, 2022.
Second Office Action issued in counterpart Chinese Patent Application No. 202110899177.X, dated Apr. 28, 2022.

* cited by examiner

LARGE-CURRENT AND LOW-VOLTAGE SERVO MOTOR

CROSS-REFERENCE TO RELATED APPLICATIONS

This application is a continuation application of International Application No. PCT/CN2022/091742, filed on May 9, 2022, which claims priority to Chinese Patent Application No. 202110899177.X, filed on Aug. 5, 2021. The disclosures of the aforementioned applications are incorporated in this application by reference in their entirety and for all purposes.

TECHNICAL FIELD

The present application relates to the field of servo motors, in particular to a high-current and low-voltage servo motor.

BACKGROUND

With the rapid development of information technology, a more convenient and rapid transmission mode is required for the automation field. A transmission system powered by a storage battery greatly improves the flexibility and adaptability of the transmission system, and also produces the demand for the low-voltage servo motors.

The low-voltage servo motor includes the permanent magnet synchronous motor and the excitation motor. The permanent magnet synchronous motor is a novel motor developed in recent years, and has poor stability and poor precision during low-speed operation.

SUMMARY

The main purpose of the present application is to provide a high-current and low-voltage servo motor, which aims to solve the technical problem of poor stability during low-speed operation of an existing motor.

In order to achieve the above purpose, an embodiment of the present application provides a high-current and low-voltage servo motor, which includes:
  a housing with a mounting space inside;
  a stator assembly including a stator core arranged in the mounting space, and an inner circumference of the stator core being provided with stator slots for receiving coils;
  a coil winding received in the stator slots and the coil winding being a three-phase coil winding, a coil winding of each phase including two parallel branches, each of the two parallel branches including two coils, two sides of each coil being distributed in two adjacent stator slots, each stator slot receiving two sides, and one of the two sides of each coil acting as an effective side to achieve two tiers of coil winding; and
  a rotor assembly including a rotor core, the stator core being sleeved on the rotor core, a plurality of magnetic steels of an arc shape being adsorbed on an outer peripheral surface of the rotor core, each magnetic steel having an inner arc surface and an outer arc surface eccentrical to the inner arc surface, and the plurality of magnetic steels are sequentially distributed to form alternate N and S polarities.

In an embodiment of the present application, effective edges of the coils are arranged in the stator slots, and sequentially correspond to a first phase, a second phase, a second phase, a third phase, a third phase, a first phase, a first phase, a second phase, a second phase, a third phase, a third phase, and a first phase.

In an embodiment of the present application, two adjacent coils of the same phase are parallel connected, and/or, among coils of the two parallel branches, every two opposite coils having a smaller distance therebetween are connected in series.

In an embodiment of the present application, each stator slot has two first side surfaces opposite to each other and spaced apart from each other, and a second side surface connecting the two first side surfaces, the two first side surfaces and the second side surface forming a cavity for receiving the coils and a notch for expose the coils, and a smooth transition is formed between each first side surface and the second side surface.

In an embodiment of the present application, one end of each of the first side faces, which is away from the second side surface, is provided with an extension portion, the extension portion is extended towards the other of the first side faces, and the notch is formed between two extension portions, a side surface of the extension portion, which faces the cavity, is obliquely arranged to be away from the cavity.

In an embodiment of the present application, a perpendicular distance between a circle center of the inner arc surface and a horizontal plane is less than a perpendicular distance between a circle center of the outer arc surface and the horizontal plane to make the outer arc surface eccentrical to the inner arc surface.

In an embodiment of the present application, the rotor assembly further includes a fixing ring sleeved outside the rotor core, and the magnetic steels are clamped between the fixing ring and the rotor core.

In an embodiment of the present application, an elastic portion is arranged on one side of the fixing ring facing the magnetic steels, and the elastic portion is abutted against outer arc surfaces of the magnetic steels, and the magnetic steels have a trend of moving towards an axis of the rotor core.

In an embodiment of the present application, the outer arc surfaces of the magnetic steels are provided with a limiting groove, and one end of the elastic portion is clamped into the limiting groove.

In an embodiment of the present application, the outer peripheral surface of the rotor core is provided with magnetic isolation grooves, and each magnetic isolation groove has a bottom surface and an opening, the inner arc surface of a corresponding magnetic steel is attached to the bottom surface, the outer arc surface of the corresponding magnetic steel is exposed through the opening, and the correspondingly magnetic steel is clamped between the fixed ring and the bottom surface.

Compared with the related art, in the embodiments of the present application, by providing the stator slots on the stator core for mounting the coil winding, the magnetic steels disposed on the rotor core can generate a rotating magnetic field when a sine wave current is introduced into the coil winding and the rotor can keep rotating. In addition, the coil winding of each phase includes two branches connected in parallel, and each of the two parallel branches includes two coils connected in series, and thus a stable and continuous current can be provided for the motor to operate. In addition, in order to cater to the demand of low voltage during operation of the motor, the structure of the coil winding is improved without changing the rated power of the motor. That is, two sides of each coil, one of which is an effective side, are placed in two adjacent stator slots, and each stator slot receives two sides belonging to two coils to realize the two tiers of coil winding. By this way, on one hand, the cogging torque of the motor is reduced, and on the other hand, the back electric motive force of the motor is improved appropriately. Thus, the stable operation of the motor is ensured. Meanwhile, the outer arc surface and the inner arc surface of each magnetic steel are eccentrically arranged. The outer arc surface of the magnetic steel thus can be closer to the coil winding on the stator. The distance between the outer arc surface of each magnetic steel and the coil winding is reduced. The use rate of each magnetic steel can be improved. The performance of the magnetic steel can be fully exerted, and the working efficiency of the motor is thus improved.

BRIEF DESCRIPTION OF THE DRAWINGS

In order to more clearly explain the embodiments of the present application or the technical solutions in the related art, the drawings used in the description of the embodiments or the related art will be briefly introduced below. Obviously, the drawings in the following description are merely some embodiments of the present application. For those of ordinary skill in the art, other drawings can be obtained based on the structure shown in these drawings without creative work.

Figure 1:
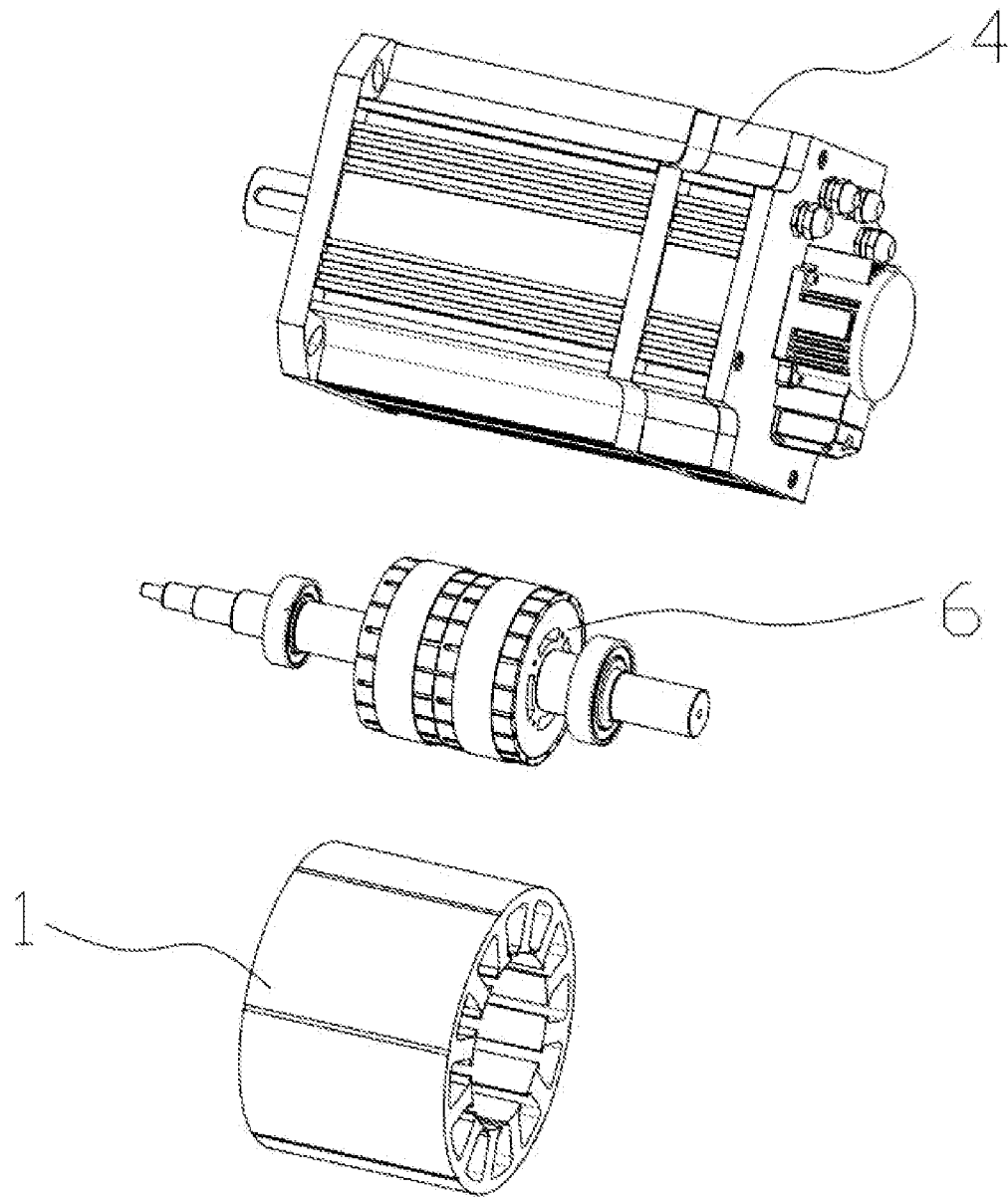
FIG. 1 is a schematic exploded view of a large-current low-voltage servo motor according to an embodiment of the present application.
Figure 2:
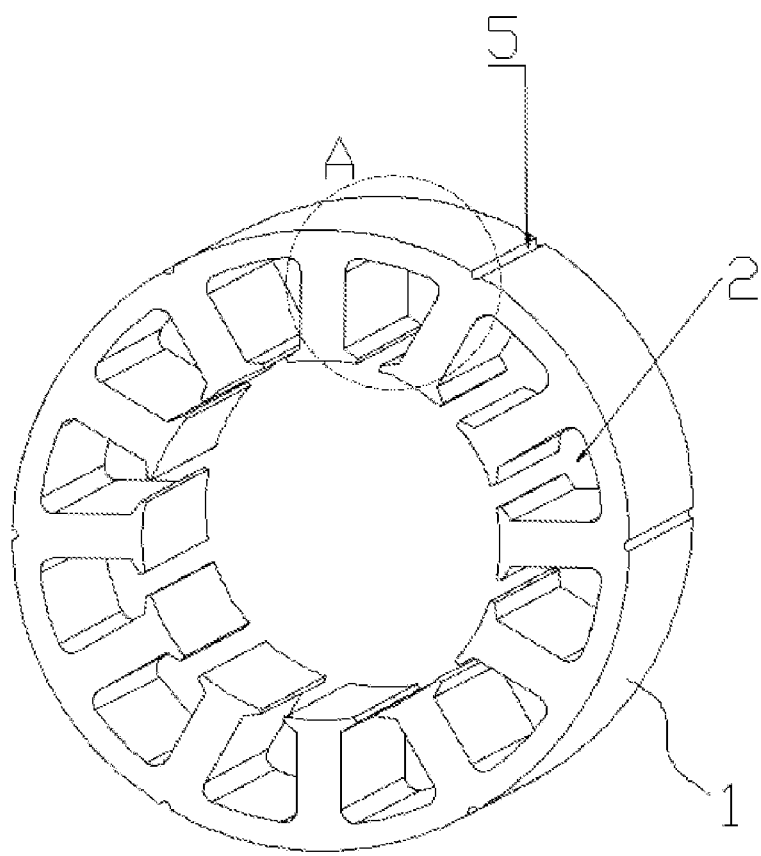
FIG. 2 is a schematic structural view of a stator assembly in FIG. 1.

The realization of the purposes, functional features and advantages of the present application will be further explained with reference to the accompanying drawings in combination with the embodiments.

DETAILED DESCRIPTION OF THE EMBODIMENTS

In the following, the embodiments of the present application will be clearly and completely described with reference to the drawings in the embodiments of the present application. Obviously, the described embodiments are only some of the embodiments of the present application, and not all of the embodiments. Based on the embodiments of the present application, all other embodiments obtained by those of ordinary skilled in the art without creative efforts shall fall within the claimed scope of the present application.

It should be noted that all directional indicators (such as up, down, left, right, front, back, etc.) in the embodiments of the present application are only used to explain the relative positional relationship, movement situation, etc. between components in a specific attitude (as shown in the drawings). If the specific attitude changes, the directional indication also changes accordingly.

In addition, the descriptions related to "first", "second" and the like in the present application are for descriptive purposes only, and should not be understood as indicating or implying their relative importance or implicitly indicating the number of technical features indicated. Therefore, a feature defined by "first" and "second" may explicitly or implicitly include at least one of such features. In embodiments of the present application, "multiple" means at least two, such as two, three, or the like, unless it is specifically defined.

In the embodiments of the present application, without being specifically defined, the terms "connected", "fixed", etc. should be understood broadly. For example, without being specifically defined, "fixed" may be a fixed connection or a detachable connection, or may be a mechanical connection or an electrical connection, or may be a direct connection or an indirect connection with an intermediate medium, or may be communication or an interaction relationship between two elements. For a person of ordinary skill in the art, the specific meanings of the above terms in the embodiments of the present application may be understood according to specific situations.

In addition, the embodiments of the present application may be combined with each other, but the combination must be based on that a person of ordinary skill in the art can realize it. When the combination of the embodiments is contradictory or cannot be implemented, it should be considered that the combination of the embodiments does not exist, and not fall within the claimed scope of the embodiments of the present application.

As shown in FIG. 1, FIG. 2, and FIG. 5 to FIG. 7, a high-current and low-voltage servo motor according to an embodiment of the present application includes:

a housing 4 with a mounting space inside;

a stator assembly including a stator core 1 arranged in the mounting space, and an inner circumference of the stator core 1 being provided with stator slots 2 for receiving coils;

a coil winding which is a three-phase coil winding, a coil winding of each phase including two parallel branches, each of the two parallel branches including two coils 3, two sides of each coil 3 being respectively received in two adjacent stator slots 2, each stator slot 2 receiving two sides, and one of the two sides of each coil 3 acting as an effective side to achieve two tiers of coil winding;

a rotor assembly including a rotor core 6, the stator core 1 being sleeved on the rotor core 6, a plurality of magnetic steels 7 of an arc shape being adsorbed on an outer peripheral surface of the rotor core 6, each magnetic steel 7 having an inner arc surface 71 and an outer arc surface 72 eccentrical to the inner arc surface 71, and the plurality of magnetic steels 7 are sequentially distributed to form alternate N and S polarities.

In this embodiment, twelve stator slots 2 are provided on the stator core 1 to mount the coil winding which cooperate with ten magnetic poles arranged on the rotor. When a sinusoidal current is introduced into the coil winding, a rotating magnetic field is generated and the rotor keeps rotating. In addition, the coil winding of each phase includes two branches connected in parallel, and each of the two parallel branches includes two coils 3 connected in series, and thus a stable and continuous current can be provided for the motor to operate. In addition, in order to cater to the demand of low voltage during operation of the motor, the structure of the coil winding is improved without changing the rated power of the motor. That is, two sides of each coil 3, one of which is an effective side, are placed in two adjacent stator slots 2, and each stator slot 2 receives two sides belonging to two coils to realize the two tiers of coil winding. By this way, on one hand, the cogging torque of the motor is reduced, and on the other hand, the back electric motive force of the motor is improved appropriately. Thus the stable operation of the motor is ensured.

In one embodiment, the stator assembly of the motor generally includes a stator core 1 and coils 3, the coils 3 are embedded in the stator slots 2 of the stator core 1, the coils 3 are usually divided into a plurality of groups, and the plurality of groups of coils 3 may be connected in series and in parallel to form the coil winding. In this embodiment, the coil winding is three phases. That is, the coil winding includes a first phase coil winding, a second phase coil winding, and a third phase coil winding. The coil winding of each phase includes two parallel branches, and each branch includes two coils 3 connected in series. That is, the coil winding of each phase includes four coils 3, which can be used for introducing a sinusoidal current for the coil winding to cooperate with magnetic poles on the rotor to generate a rotating magnetic field, and the rotor thus keeps rotating.

In addition, in order to cater to the demand of low voltage during operation of the motor, the structure of the coil winding is improved without changing the rated power of the motor. In one embodiment, the coil winding of each phase mentioned above includes four coils 3. Each coil 3 is distributed in two different stator slots 2. There are twelve stator slots 2. It can be understood that all the coils 3 are arranged to be two tiers in the stator slots 2, and in addition, only one of the two sides of each coil 3 can select as an effective side. For example, referring to FIG. 3 and FIG. 4, two sides of a first coil 3 are received in a first stator slot 2 and a twelfth stator slot 2, and two sides of a second coil 3 are received in the first stator slot 2 and a second stator slot 2. The effective side in the first stator slot 2 can be the first coil 3. Accordingly the effective side in the second stator slot 2 is a side of the second coil 3, the effective side in the third stator slot 2 is a side of the third coil 3, and the effective side in the twelfth stator slot 2 is not a side of the first coil 3. Alternatively, the effective side in the first stator slot 2 may be a side of the second coil 3. Accordingly, the effective side in the second stator slot 2 is a side of the third coil 3, the effective side in the third stator slot 2 is not a side of the third coil 3, and the effective side in the twelfth stator slot 2 is a side of the first coil 3, and so on, which will not be described in detail. In this way, the two tiers of coil winding is realized. On one hand, the cogging torque of the motor can be reduced, and on the other hand, the back electric motive force of the motor can be improved. The stable operation of the motor is thus ensured.

Meanwhile, the outer arc surface 72 and the inner arc surface 71 of each magnetic steel 7 are eccentrically arranged. The outer arc surface 72 of the magnetic steel 7 thus can be closer to the coil winding on the stator. The distance between the outer arc surface 72 of each magnetic steel 7 and the coil winding is reduced. The use rate of each magnetic steel 7 can be improved. The performance of the magnetic steel 7 can be fully exerted, and the working efficiency of the motor is thus improved.

The rotor core 6 is usually formed by laminating silicon steel sheets, and the magnetic steels 7 are arranged on the outer peripheral surface of the rotor core 6. Since the magnetic steels 7 have magnetism, the magnetic steels 7 can be directly adsorbed on the outer peripheral surface of the rotor core 6. The magnetic steels 7 can be protruded from the outer peripheral surface of the rotor core 6, or embedded in the rotor core6. In other words, the magnetic steels 7 can be directly adsorbed on the outer peripheral surface of the rotor core 6. Alternatively, recesses are formed on the outer peripheral surface of the rotor core 6 for receiving the magnetic steels 7. The recesses can be square troughs, circular troughs or irregular troughs. When the magnetic steels 7 are directly attached to the outer peripheral surface of the rotor core 6, due to the fact that the rotor core 6 and the magnetic steel 7 are mainly adsorbed together by a magnetic force, the magnetic steels 7 are easily deflected by an external force due to that the magnetic steels 7 are not firmly fixed to the rotor core 6, which adversely affects the rotating magnetic field and adversely affects the normal operation of the servo motor. Therefore, in an embodiment, the magnetic steels 7 are received in the recesses of the outer peripheral surface of the rotor core 6. However, when the magnetic steels 7 are accommodated in the recesses, the distance between the magnetic steels 7 and the coil winding of the stator is increased, and the utilization rate of the magnetic steels 7 is reduced. For this reason, in this embodiment, a perpendicular distance between a circle center of the inner arc surface 71 of each magnetic steel 7 and a horizontal plane is set to be smaller than a perpendicular distance between a circle center of the outer arc surface 72 of the magnetic steel 7 and the horizontal plane, and the circle center of the inner arc surface 71 is lower than the circle center of the outer arc surface 72. With the same diameter, the outer arc surface 72 can be closer to the coil winding on the stator, and the distance between the outer arc surface 72 of the magnetic steel 7 and the coil winding is reduced, which improves the performance of the magnetic steels 7, and further improve the working efficiency of the motor. Of course, a distance between the circle center of the inner arc surface 71 and the circle center of the outer arc surface 72 may be selected according to specific usage conditions, which is not limited herein. In an embodiment, the outer arc surface 72 is protruded slightly from the outer peripheral surface of the rotor core 6. It can be understood that the outer arc surface 72 is exposed from the hollowed-out structure. Thus, on the one hand, the movement of the magnetic steels 7 can be limited by the recesses, and on the other hand, the outer arc surface 72 can be closer to the coil winding, which improves the utilization rate of the magnetic steels 7. In addition, the magnetic steel 7 is parallel magnetized. The magnetizing is simple, and the magnetic steel 7 is convenient to be used.

Further, in an embodiment of the present application, the effective sides of the coils 3 are arranged in the stator slots 2, which sequentially correspond to the first phase, the second phase, the second phase, the third phase, the third phase, the first phase, the first phase, the second phase, the second phase, the third phase, the third phase, and the first phase.

In this embodiment, each of the twelve coils 3 of the coil winding has only one side acting as an effective side, and all the coils 3 constitute the whole three-phase coil winding, and the phases correspond to the effective sides of the coils 3 are sequentially the first phase, the second phase, the second phase, the third phase, the third phase, the first phase, the first phase, the second phase, the second phase, the third phase, the third phase and the first phase, and accordingly, the phases corresponding to non-effective sides are sequentially the second phase, the second phase, the third phase, the third phase, the first phase, the first phase, the second phase, the second phase, the third phase, the third phase, the first phase and the first phase. In this way, a stable rotating magnetic field can be formed, the effective rotation of the rotor is ensured, and the operation stability of the motor is improved.

Further, in one embodiment of the present application, two adjacent coils 3 of the same phase are parallel connected, and among the coils 3 of the two parallel branches in each phase, every two opposite coils 3 which has a smaller distance therebetween are connected in series.

In this embodiment, the three-phase coil winding includes twelve coils 3, each phase has four coils 3, the four coils 3 in each phase are divided into two parallel branches, and each parallel branch includes two coils 3. In order to facilitate winding of the coil winding, and ensure that a stable rotating magnetic field can be generated when the coil winding is energized, in the coils 3 of the two parallel branches, two adjacent coils 3 of the same phase are connected in series. In an embodiment, if the phases corresponding to the effective sides in the first to twelfth stator slots 2 are the first phase, the second phase, the second phase, the third phase, the third phase, the first phase, the first phase, the second phase, the second phase, the third phase, the third phase and the first phase, the coils 3 in the first stator slot 2 and the twelfth stator slot 2 are connected in parallel, and the coils 3 in the sixth stator slot 2 and the seventh stator slot 2 are connected in parallel. The coils 3 in the first stator slot 2 and the sixth stator slot 2 are connected in series, and the coils 3 in the seventh stator slot 2 and the twelfth stator slot 2 are connected in series. The coils 3 in the second stator slot 2 and the third stator slot 2 are connected in parallel, and the coils 3 in the eighth stator slot 2 and the ninth stator slot 2 are connected in parallel. The coils 3 in the second stator slot 2 and the ninth stator slot 2 are connected in series, and the coils 3 in the third stator slot 2 and the eighth stator slot 2 are connected in series, and so forth and the details are not repeated here. Therefore, the arrangement of the coil winding is facilitated, the working efficiency can be improved, a stable rotating magnetic field can be formed, and the stable operation of the motor is ensured.

Figure 3:
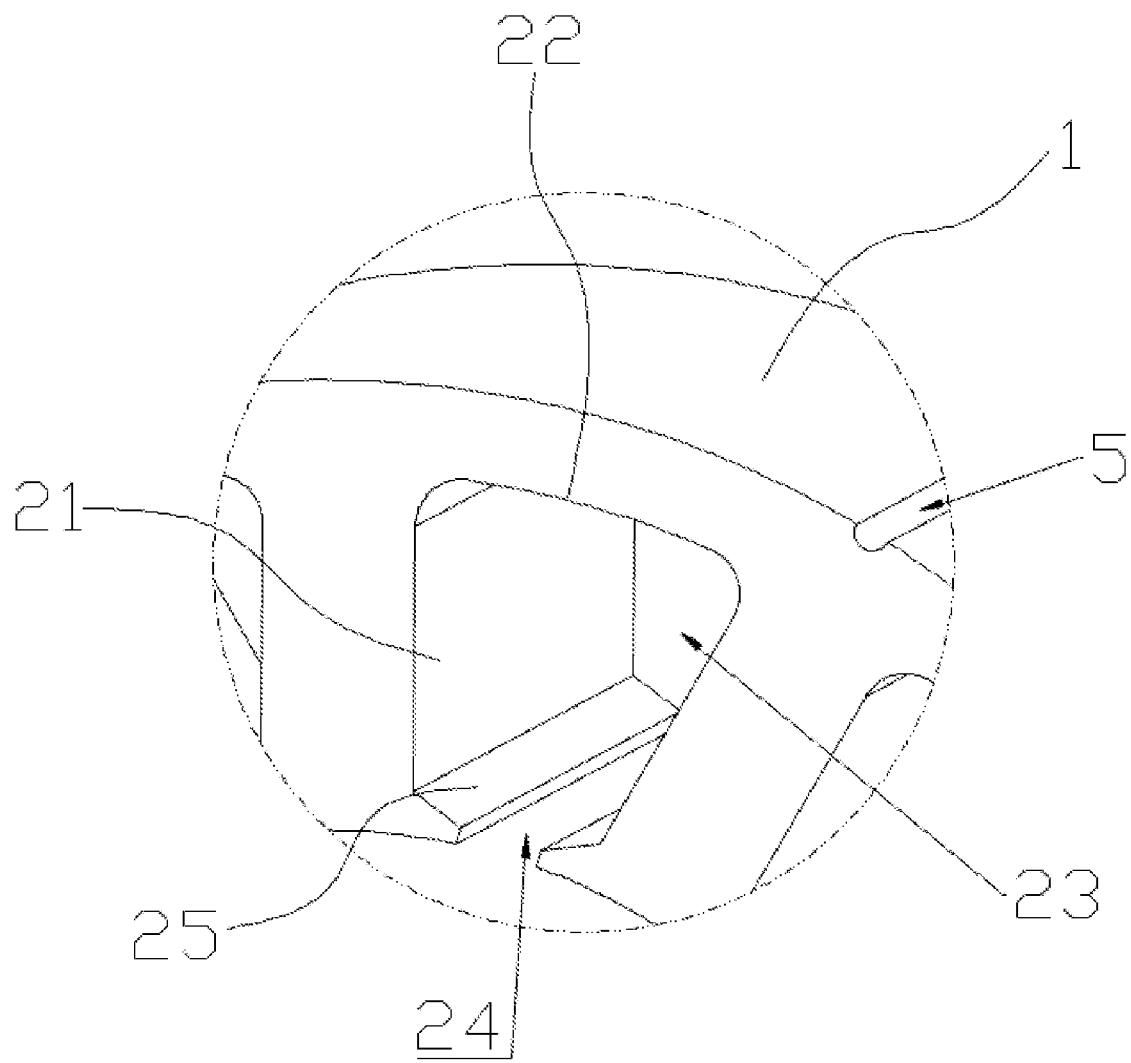
FIG. 3 is an enlarged view of portion A in FIG. 2.
Figure 4:
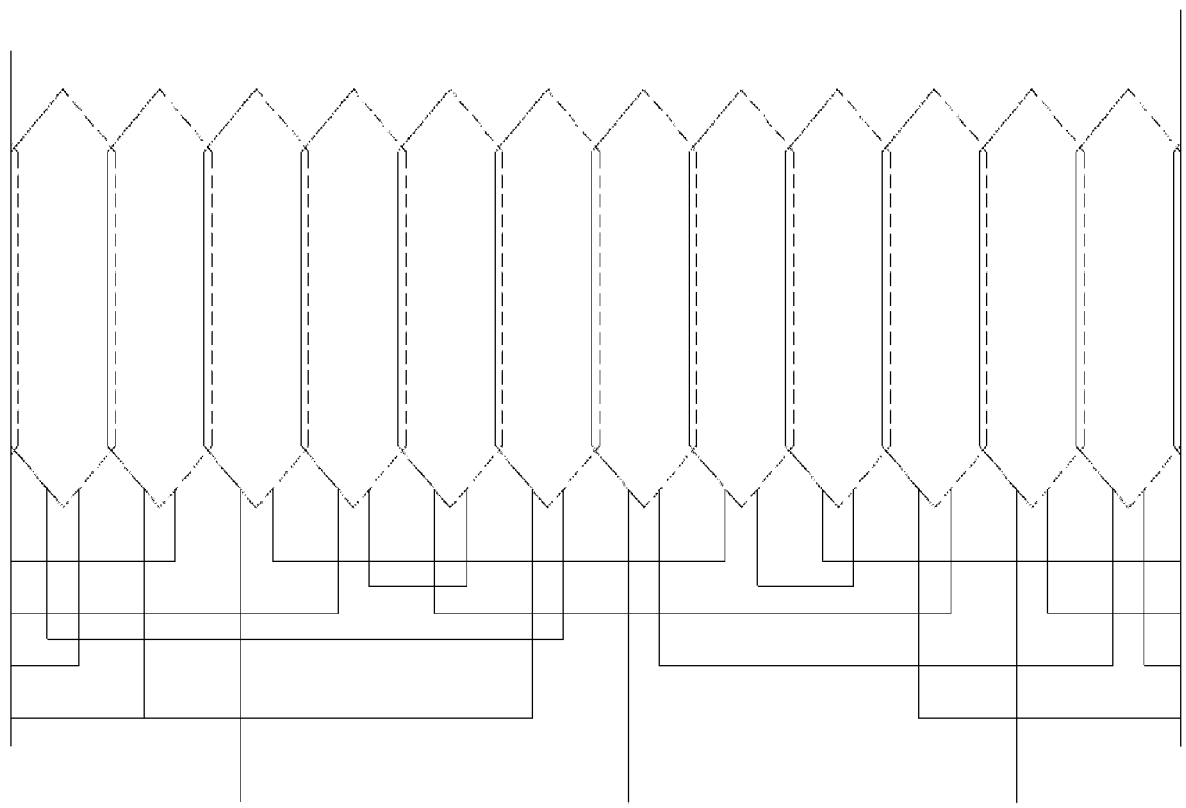
FIG. 4 is a first schematic deployment view of a winding of a coil winding.
Figure 5:
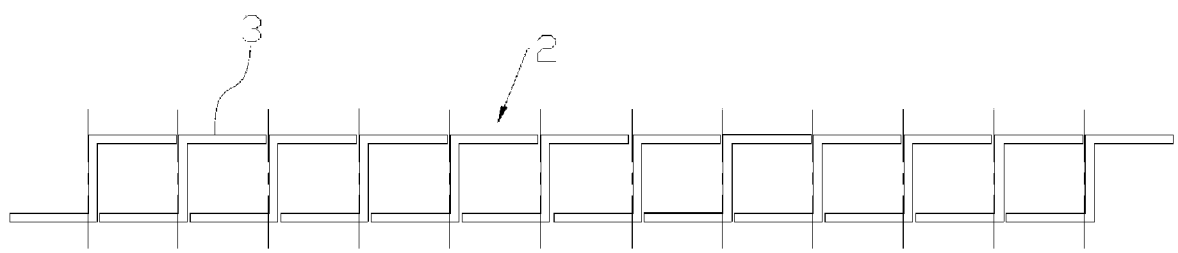
FIG. 5 is a second schematic deployment view of the winding of the coil winding.

Further, referring to FIG. 3, in an embodiment of the present application, each stator slot 2 has two first side surfaces 21 which are opposite to each other and spaced apart from each other, and a second side surface 22 connecting the two first side surfaces 21. The two first side surfaces 21 and the second side surfaces 22 form a cavity 23 for receiving the coils 3, and a notch 24 communicating with the cavity 23 and exposing the coils 3. The first side surface 21 and the second side surface 22 are smoothly connected by a smooth structure.

In this embodiment, when to mount a coil 3, the coil 3 can be moved into the cavity 23 from the notch 24, and the disassembly and assembly of the coil 3 is facilitated. In addition, a smooth curved surface between each first side surface 21 and the second side surface 22 can avoid damage to the coil 3, which ensures the stability of the rotating magnetic field. In an embodiment, the smooth curved surface is an arc surface. In the present embodiment, the notch 24 and the second side surface 22 are located at opposite ends of each first side surface 21, that is, two opposite ends of the two first side surfaces 21 are provided with the second side surface 22, and the other two opposite ends of the two first side surfaces 21 are provided with the notch 24.

Further, referring to FIG. 3, in an embodiment of the present application, one end of each first side surface 21, which is away from the second side surface 22, is provided with an extension portion 25. The extension portion 25 is extended toward the other first side surface 21, and the notch 24 is formed between the two extension portions 25. A side surface of the extension portion, which faces the cavity 23 is inclined to be away from the cavity 23.

In this embodiment, the extension portion 25 may provide support for the coils 3, and prevent the coils 25 from disengaging from the cavity 23. In addition, the extension portion 25 is arranged obliquely away from the cavity 23, and the distance between the coils 3 and the magnetic poles on the rotor can be reduced, which is helpful for the electromagnetic effect of the magnetic pole and the coil 3. The extending portion 25 is obliquely arranged to be away from the cavity 23, which can be understood that a distance from one end of the extension portion 25, which is close to the notch 24, to the second side surface 22 is greater than a distance from the other end of the extension portion 25 which is away from the notch 24, to the second side surface 22.

In one embodiment, a tooth is formed between two adjacent stator slots 2, the extension portions 25 and the teeth cooperate to form a mounting cavity for mounting the rotor, side surfaces of the extension portions 25 and side surfaces of the teeth facing the mounting cavity are arc-shaped, and all the extension portions 25 and all the teeth form the circular mounting cavity which is matched with a shape of the rotor to facilitate the mounting of the rotor, and is beneficial for the magnetic poles on the rotor to electromagnetically interact with the coils 3.

Further, in an embodiment of the present application, the stator core 1 and/or the rotor core 6 are formed by stamping, laminating and soldering silicon steel sheets.

In this embodiment, the alternating current in the coils can generate alternating magnetic flux, which generates an induced current in the stator core 1. The induced current is circulated in a plane perpendicular to a direction of the magnetic flux, and thus is called as an eddy current. The eddy current loss causes the stator core 1 to heat. In order to reduce eddy current loss, the stator core 1 is formed by stacking silicon steel sheets insulated from each other, thus the eddy current passes through a smaller cross section to increase the resistance on the eddy current path. At the same time, the silicon in the silicon steels increases the resistivity of the material and also plays a role in reducing the eddy current. Similarly, the rotor core 6 is formed by laminating silicon steel sheets insulated from each other. A current flowing area, eddy current loss and hysteresis loss can be reduced, and the heat of the rotor core 6 can also be reduced.

Further, referring to FIG. 3, in an embodiment of the present application, a positioning groove 5 is provided on an outer peripheral surface of the stator core 1 and between two adjacent stator slots 2.

In this embodiment, the stator can be conveniently positioned through the positioning groove 5. The positioning groove 5 is located between two adjacent stator grooves 2. That is, the positioning groove 5 is located on the teeth which can ensure the strength of the stator core 1. The positioning groove 5 may be a square groove or may extend along an axial direction of the stator core 1. There may be multiple positioning grooves 5. In an embodiment, every two adjacent stator slots 2 is provided with one positioning groove 5.

Figure 6:
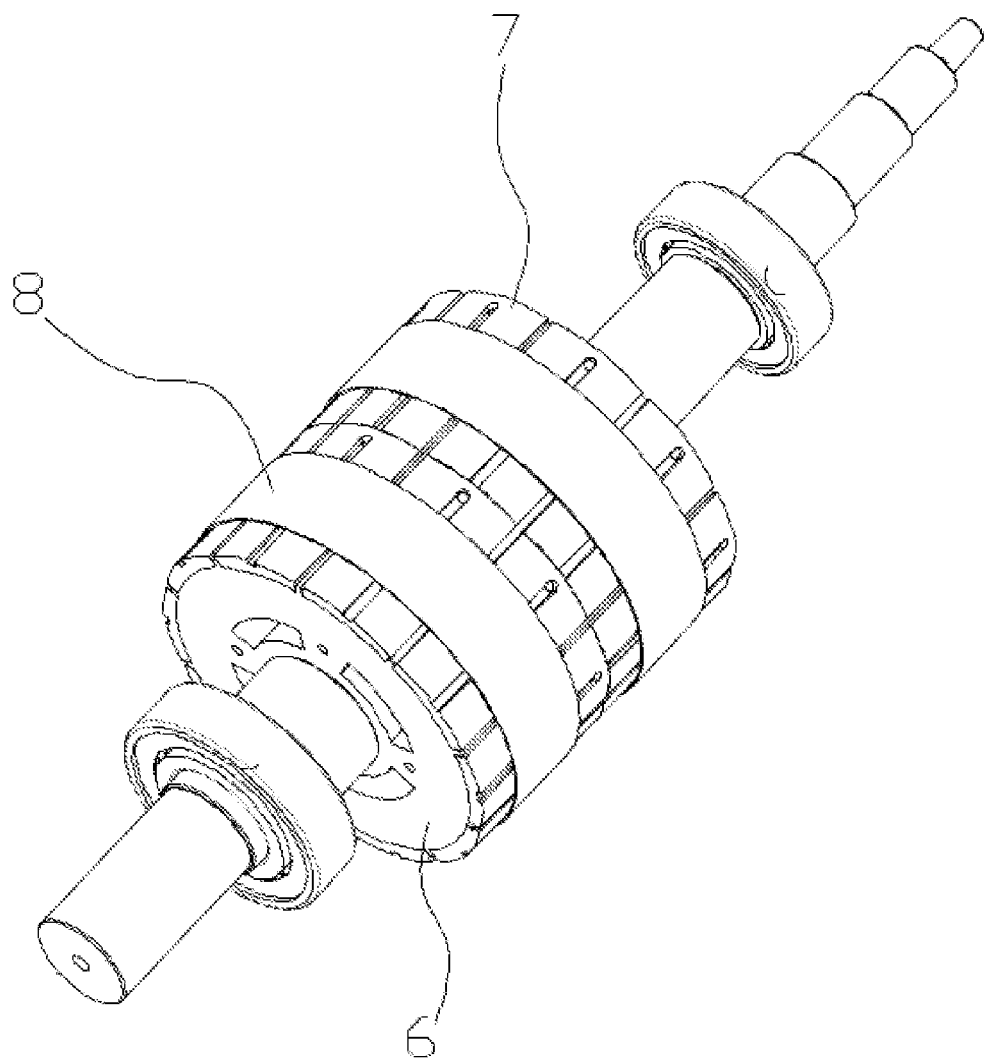
FIG. 6 is a schematic structural view of a rotor assembly in FIG. 1.

Further, referring to FIG. 6, in an embodiment of the present application, the rotor assembly further includes a fixing ring 8 sleeved outside the rotor core 6, and the magnetic steels 7 are clamped between the fixing ring 8 and the rotor core 6.

In this embodiment, since the outer arc surface 72 of each magnetic steel 7 is protruded beyond the outer peripheral surface of the rotor core 6, in order to improve the firmness of fixing the magnetic steels 7 and the rotor core 6, the fixing ring 8 is provided. The fixing ring 8 and the rotor core 6 are provided to clamp the magnetic steels 7. The magnetic steels 7 are fixed between the fixing ring 8 and the rotor core 6, which ensures that the rotating magnetic field can drive the rotor core 6 to rotate.

In an embodiment, there may be multiple fixing rings 8 spaced apart from each other along an axial direction of the rotor core 6, and the firmness of the fixing ring 8 fixing the magnetic steel 7 can be further improved. In addition, in order to facilitate the sleeve of the fixing ring 8 on the magnetic steels 7, the fixing ring 8 may include a first sub-ring and a second sub-ring which are movably connected with each other, and two ends of the first sub-ring and two ends of the second sub-ring may be clamped or bolted together. Of course, one end of the first sub-ring and one end of the second sub-ring may be rotatably connected, and the other end of the first sub-ring and the other end of the second sub-ring may be clamped or bolted together. In this way, disassembly and assembly of the fixing ring 8 can be facilitated, and the convenience of use is improved.

In an embodiment, the material of the fixing ring 8 is a non-magnetic conductive material. The fixing ring 8 is made of a non-magnetic conductive material, which can prevent the rotating magnetic field absorbing the magnetic steels 7 from being adversely affected, and the rotating magnetic field can effectively drive the magnetic steels 7 to rotate. In an embodiment, the non-magnetic conductive material may be a metal or a corresponding alloy other than iron, cobalt, nickel and alloys thereof, such as stainless steel, copper, or the like.

Figure 8:
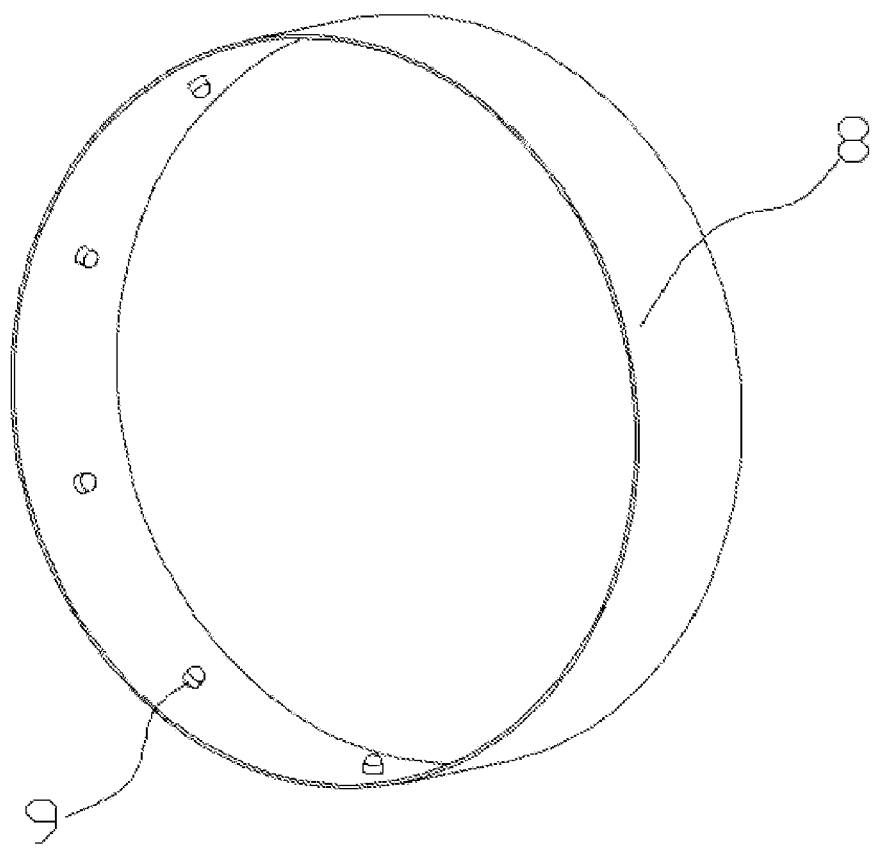
FIG. 8 is a schematic structural view of a fixing ring in FIG. 6.

Further, referring to FIG. 8, in an embodiment of the present application, an elastic portion 9 is disposed on a side of the fixing ring 8 facing the magnetic steels 7. The elastic portion 9 abuts against the outer arc surface 72 of the magnetic steels 7, and the magnetic steel 7 has a tendency to move toward an axis of the rotor core 6.

In this embodiment, in order to further improve the clamping effect of the fixing ring 8 and the rotor core 6 on the magnetic steels 7, an elastic portion 9 is provided. One end of the elastic portion 9 may be connected to the fixing ring 8, and the other end of the elastic portion 9 is extended toward the rotor core 6. When the fixing ring 8 is sleeved outside the magnetic steels 7, the elastic portion 9 is compressed and deformed to generate an elastic force. The end of the elastic portion, which is close to the magnetic steels 7, tightly abuts against the outer arc surfaces 72 of the magnetic steels 7, and cooperates with the rotor core 6 to clamp the magnetic steels 7. The firmness of fixing the magnetic steels 7 is improved. In an embodiment, the elastic portion 9 may be any one of a spring and an elastic piece. In addition, in order to prevent the elastic portion 9 from scratching the magnetic steels 7, a pressing portion may also be provided at one end of the elastic portion 9 which is away from the fixing ring 8. The pressing portion is made of a flexible material, such as any one of silicone and rubber. The pressing portion is in direct contact with the magnetic steels 7, and prevent the elastic portion 9 of the harder material from scratching the outer arc surfaces 72 of the magnetic steels 7. The pressing portion is hemispherical.

Figure 7:
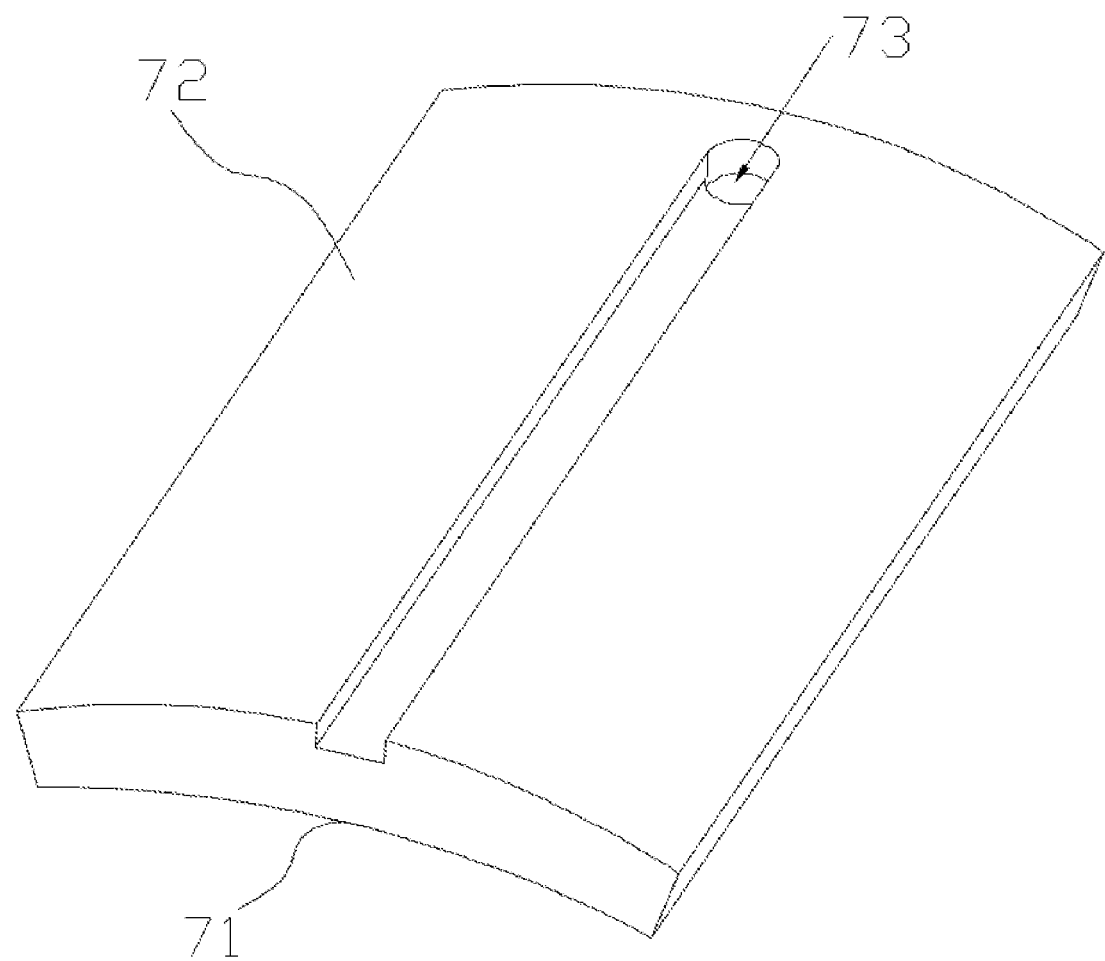
FIG. 7 is a schematic structural view of a magnetic steel in FIG. 6.

Further, referring to FIG. 7, in an embodiment of the present application, the outer arc surface 72 of a magnetic steel 7 is provided with a limiting groove 73. One end of the elastic portion 9 is clamped into the limiting groove 73.

In this embodiment, by arranging the limiting groove 73, one end of the elastic part 9, which is away from the fixing ring 8, can be clamped into the limiting groove 73. Inner walls of the limiting groove 73 cooperate with the elastic part 9 to limit a transverse movement and a radial movement of the magnetic steels 7, and the firmness of fixing the magnetic steels 7 is further improved. In an embodiment, the inner surfaces of the limiting groove 73 is matched with outer surfaces of the end of the elastic portion 9 away from the fixing ring 8, the limiting groove 73 is thus in close contact with the elastic portion 9, and the transverse movement and the radial movement of the magnetic steels 7 is better limited. If the end of the elastic portion 9 away from the fixing ring 8 is provided with a pressing portion, the inner surfaces of the limiting groove 73 is matched with outer surfaces of the pressing portion.

In addition, in order to enable the elastic portion 9 to be conveniently clamped in the limiting groove 73, a guiding groove communicating with the limiting groove 73 may be formed in the outer arc surface of the magnetic steel 7. The guiding groove is extended along the axial direction of the rotor core 6. When to sleeve the fixing ring 8 outside the rotor core 6, the elastic portion 9 may slide along the guiding groove until the elastic portion 9 is clamped in the limiting groove 73. It should be noted that a depth of the guiding groove is smaller than a depth of the limiting groove 73, which prevents the elastic portion 9 from sliding out of the limiting groove 73 when a force is applied on the magnetic steels 7, and the magnetic steels 7 can be better fixed.

Figure 9:
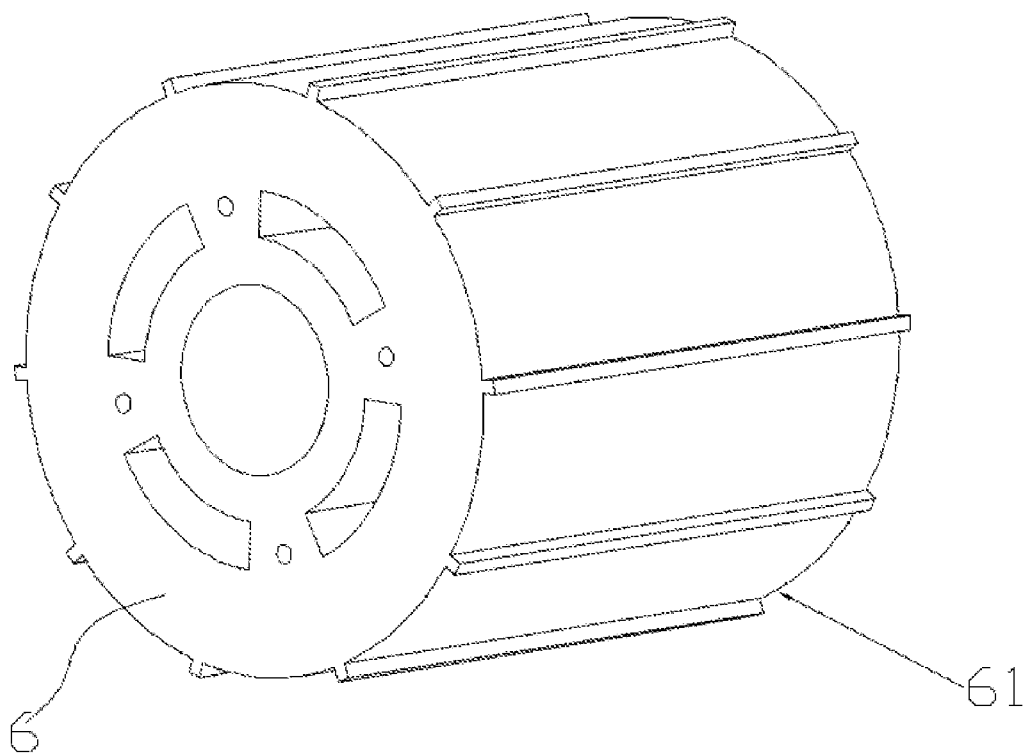
FIG. 9 is a schematic structural view of a rotor core in FIG. 6.

Further, referring to FIG. 9, in an embodiment of the present application, the outer peripheral surface of the rotor core 6 is provided with magnetic isolation grooves 61. Each magnetic isolation groove 61 has a bottom surface and an opening. The inner arc surface 71 of a magnetic steel 7 is attached to the bottom surface of a magnetic isolation groove 61, and the outer arc surface 72 of the magnetic steel 7 is exposed though the opening. The magnetic steel 7 is clamped between the fixing ring 8 and the bottom surface of the magnetic isolation groove 61.

In this embodiment, the magnetic steels 7 can be mounted through the magnetic isolation grooves 61, and the magnetic steels 7 are magnetically attracted to the bottom surfaces of the magnetic isolation grooves 61. That is, the inner arc surfaces 71 are adsorbed and connected to the bottom surfaces of the magnetic isolation grooves 61. In an embodiment, the bottom surfaces of the magnetic isolation grooves 61 are adapted to the inner arc surfaces 71. In addition, in order to facilitate installation of the magnetic steels 7, a notch communicating with inside of each magnetic isolation groove 61 can be further provided, and the magnetic steels 7 are slid into the magnetic isolation grooves 61 through the notches.

The above is only an optional embodiment of the present application, and is not therefore limiting the scope of the present application. Any equivalent structural transformation made by using the contents of the specification and drawings of the present application or any direct/indirect application in other related technical fields under the inventive concept of the present application is included in the claimed scope of the present application.

What is claimed is:

1. A high-current and low-voltage servo motor comprising:
a housing with a mounting space inside;
a stator assembly comprising a stator core arranged in the mounting space, and an inner circumference of the stator core being provided with stator slots for receiving coils;
a coil winding received in the stator slots and the coil winding being a three-phase coil winding, a coil winding of each phase comprising two parallel branches, each of the two parallel branches comprising two coils, two sides of each coil being distributed in two adjacent stator slots, each stator slot receiving two sides, and one of the two sides of each coil acting as an effective side to achieve two tiers of coil winding; and a rotor assembly comprising a rotor core, the stator core being sleeved on the rotor core, a plurality of magnetic steels of an arc shape being adsorbed on an outer peripheral surface of the rotor core, each magnetic steel having an inner arc surface and an outer arc surface eccentrical to the inner arc surface, and the plurality of magnetic steels are sequentially distributed to form alternate N and S polarities;

wherein effective edges of the coils are arranged in the stator slots, and sequentially correspond to a first phase, a second phase, a second phase, a third phase, a third phase, a first phase, a first phase, a second phase, a second phase, a third phase, a third phase, and a first phase; and a plurality of positioning grooves are provided on an outer peripheral surface of the stator core and each positioning groove is provided between any two adjacent stator slots.

2. The high-current and low-voltage servo motor according to claim 1, wherein two adjacent coils of the same phase are parallel connected, and/or, among coils of the two parallel branches, every two opposite coils having a smaller distance there between are connected in series.

3. The high-current and low-voltage servo motor according to claim 1, wherein each stator slot has two first side surfaces opposite to each other and spaced apart from each other, and a second side surface connecting the two first side surfaces, wherein the two first side surfaces and the second side surface form a cavity for receiving the coils and a notch for expose the coils, and a smooth transition is formed between each first side surface and the second side surface.

4. The high-current and low-voltage servo motor according to claim 3, wherein one end of each of the first side surfaces, which is away from the second side surface second side surface, is provided with an extension portion, the extension portion is extended towards the other of the first side surfaces, and the notch is formed between two extension portions, wherein a side surface of the extension portion, which faces the cavity, is obliquely arranged to be away from the cavity.

5. The high-current and low-voltage servo motor according to claim 1, wherein a perpendicular distance between a circle center of the inner arc surface and a horizontal plane is less than a perpendicular distance between a circle center of the outer arc surface and the horizontal plane to make the outer arc surface eccentrical to the inner arc surface.

6. The high-current and low-voltage servo motor according to claim 5, wherein the rotor assembly further comprises a fixing ring sleeved outside the rotor core, and the magnetic steels are clamped between the fixing ring and the rotor core.

7. The high-current and low-voltage servo motor according to claim 6, wherein an elastic portion is arranged on one side of the fixing ring facing the magnetic steels, and the elastic portion is abutted against outer arc surfaces of the magnetic steels, and the magnetic steels have a trend of moving towards an axis of the rotor core.

8. The high-current and low-voltage servo motor according to claim 7, wherein the outer arc surfaces of the magnetic steels are provided with a limiting groove, and one end of the elastic portion is clamped into the limiting groove.

9. The high-current and low-voltage servo motor according to claim 8, wherein the outer peripheral surface of the rotor core is provided with magnetic isolation grooves, and each magnetic isolation groove has a bottom surface and an opening, wherein the inner arc surface of a corresponding magnetic steel is attached to the bottom surface, the outer arc surface of the corresponding magnetic steel is exposed through the opening, and the correspondingly magnetic steel is clamped between the fixed ring and the bottom surface.

* * * * *